(12) United States Patent
Ding

(10) Patent No.: US 9,490,933 B2
(45) Date of Patent: Nov. 8, 2016

(54) ELECTRONIC DEVICE AND METHOD FOR REMOVING INTERFERENTIAL SIGNALS OF MOBILE DEVICE

(71) Applicant: ShenZhen Treasure City Technology Co., LTD., Shenzhen (CN)

(72) Inventor: Shang-Jue Ding, Shenzhen (CN)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 0 days.

(21) Appl. No.: 14/262,818

(22) Filed: Apr. 28, 2014

(65) Prior Publication Data

US 2015/0189663 A1 Jul. 2, 2015

(30) Foreign Application Priority Data

Dec. 31, 2013 (CN) .......................... 2013 1 07500812

(51) Int. Cl.
| | | |
|---|---|---|
| H03D 1/04 | (2006.01) | |
| H03D 1/06 | (2006.01) | |
| H03K 5/01 | (2006.01) | |
| H03K 6/04 | (2006.01) | |
| H04B 1/10 | (2006.01) | |
| H04L 1/00 | (2006.01) | |
| H04L 25/08 | (2006.01) | |
| H04L 25/03 | (2006.01) | |

(52) U.S. Cl.
CPC ........... *H04L 1/00* (2013.01); *H04L 25/03006* (2013.01)

(58) Field of Classification Search
CPC . H04L 25/08; H04W 72/082; G01R 13/0272
See application file for complete search history.

(56) References Cited

U.S. PATENT DOCUMENTS

| | | | | |
|---|---|---|---|---|
| 5,293,047 | A * | 3/1994 | Matsuda | ................... B41J 11/46 250/548 |
| 5,884,257 | A * | 3/1999 | Maekawa | ............... G10L 25/87 381/110 |
| 6,246,653 | B1 * | 6/2001 | Kanai | .................... G11B 7/005 369/124.15 |
| 2008/0125665 | A1 * | 5/2008 | Nigam | ............... A61B 5/04021 600/509 |
| 2008/0140159 | A1 * | 6/2008 | Bornhoft | .............. A61B 5/0006 607/60 |
| 2009/0273717 | A1 * | 11/2009 | Masaoka | ................ H04N 5/232 348/620 |
| 2012/0198242 | A1 * | 8/2012 | Dalzell | ................... G06F 21/55 713/190 |
| 2014/0041439 | A1 * | 2/2014 | Matsushima | ......... G01L 23/221 73/35.09 |

OTHER PUBLICATIONS

"Non-Final Office Action" mailed Jan. 29, 2015 for U.S. Appl. No. 14/262,817.*
"Notice of Allowance and Fee(s) Due" mailed May 8, 2015 for U.S. Appl. No. 14/262,817.*

* cited by examiner

*Primary Examiner* — Hirdepal Singh
*Assistant Examiner* — Amneet Singh
(74) *Attorney, Agent, or Firm* — Zhigang Ma

(57) ABSTRACT

In a method for removing interferential signals of a mobile device, an original communication signal waveform of the mobile device is acquired. A differential signal waveform corresponding to each signal frame in a group is generated, and a DPPPV of the differential signal waveform is acquired. The differential signal is determined to be an interferential signal, in response to that the DPPPV is not less than a calculated differential threshold value, and a DNPPV at a target time point is not less than a preset ratio of the DPPPV. A signal interference section is determined and compensation values corresponding to the signal interference section is calculated, to generate a differential compensation waveform of the signal frame. An integrated differential compensation waveform of all signal frames and the original communication signal waveform are incorporated to obtain a processed signal waveform without interferential signals.

12 Claims, 7 Drawing Sheets

ELECTRONIC DEVICE AND METHOD FOR REMOVING INTERFERENTIAL SIGNALS OF MOBILE DEVICE

CROSS-REFERENCE TO RELATED APPLICATIONS

This application claims all benefits accruing under 35 U.S.C. §119 from China Patent Application No. 201310750081.2, filed on Dec. 31, 2013 in the China Intellectual Property Office, the content of which is hereby incorporated by reference. This application is related to commonly-assigned applications entitled, "ELECTRONIC DEVICE AND METHOD FOR REMOVING INTERFERENTIAL SIGNALS OF MOBILE DEVICE".

BACKGROUND

1. Technical Field

Embodiments of the present disclosure generally relate to electronic devices, and particularly to an electronic device and a method for removing interferential signals of a mobile device.

2. Description of Related Art

A mobile phone of a global system for mobile communications (GSM) sends a pulse signal at each 4.615 millisecond when the GSM mobile phone is calling. If there is an electronic device near the GSM mobile phone, the pulse signal may hit the electronic device at each 4.615 millisecond and generate an interferential signal.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language. One or more software instructions in the modules may be embedded in hardware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
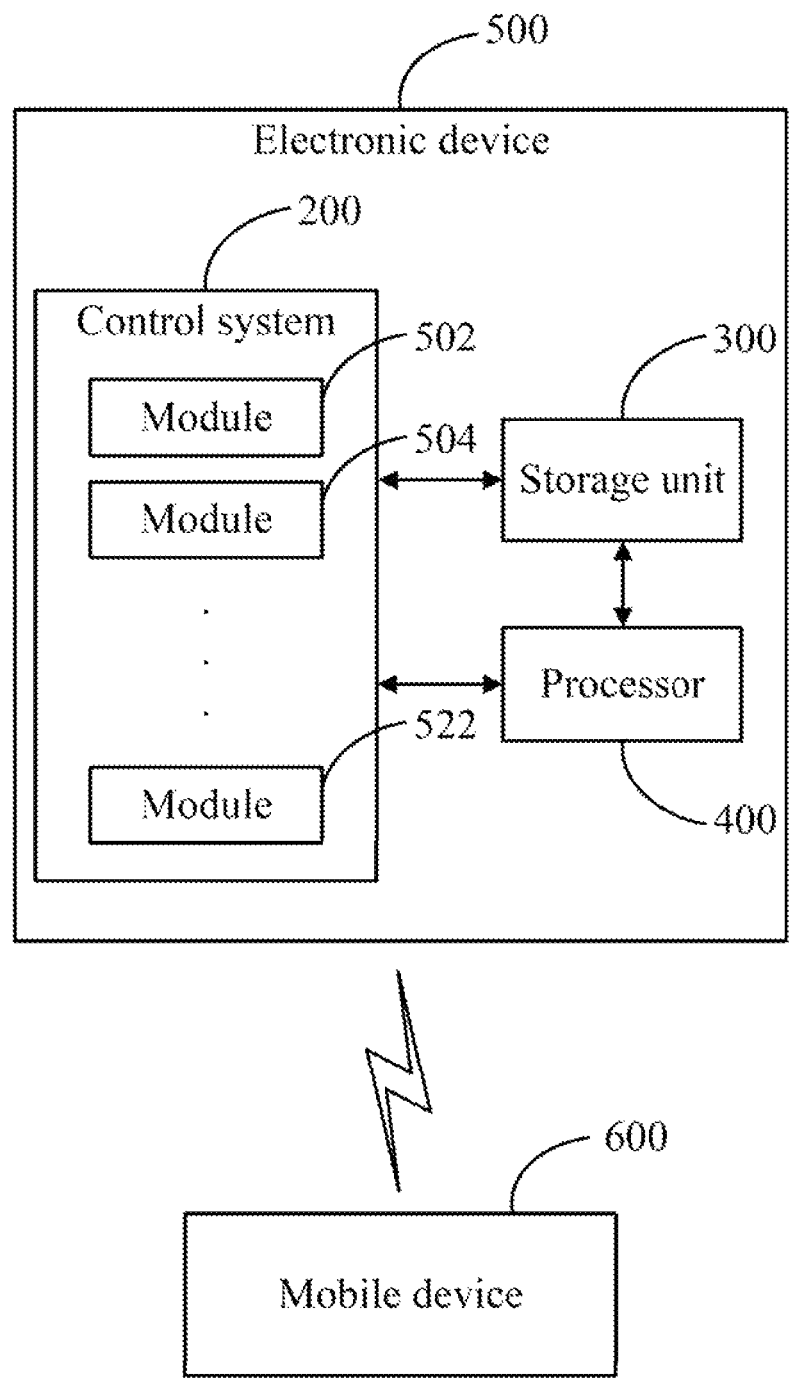
FIG. 1 is a block diagram of an embodiment of an electronic device including a control system.

FIG. 1 illustrates a block diagram of one embodiment of an electronic device 500. In the embodiment, the electronic device 500 includes a control system 200, a storage unit 300, and a processor 400. The control system 200 removes interferential signals of a mobile device 600 near the electronic device 500. In one embodiment, the electronic device 500 is a set-top box (STB), a mobile phone or a smart TV, and the mobile device 600 is a GSM mobile phone, but the disclosure is not limited thereto.

In one embodiment, the control system 200 includes one or more function modules (modules 502-522 shown in FIG. 1). The function modules (502-522) may include computerized code in the form of one or more programs that are stored in the storage unit 300, and executed by the processor 400 to perform a method for removing interferential signals of a mobile device 600. The storage unit 300 may be a dedicated memory, such as an EPROM or a flash memory.

Figure 2:
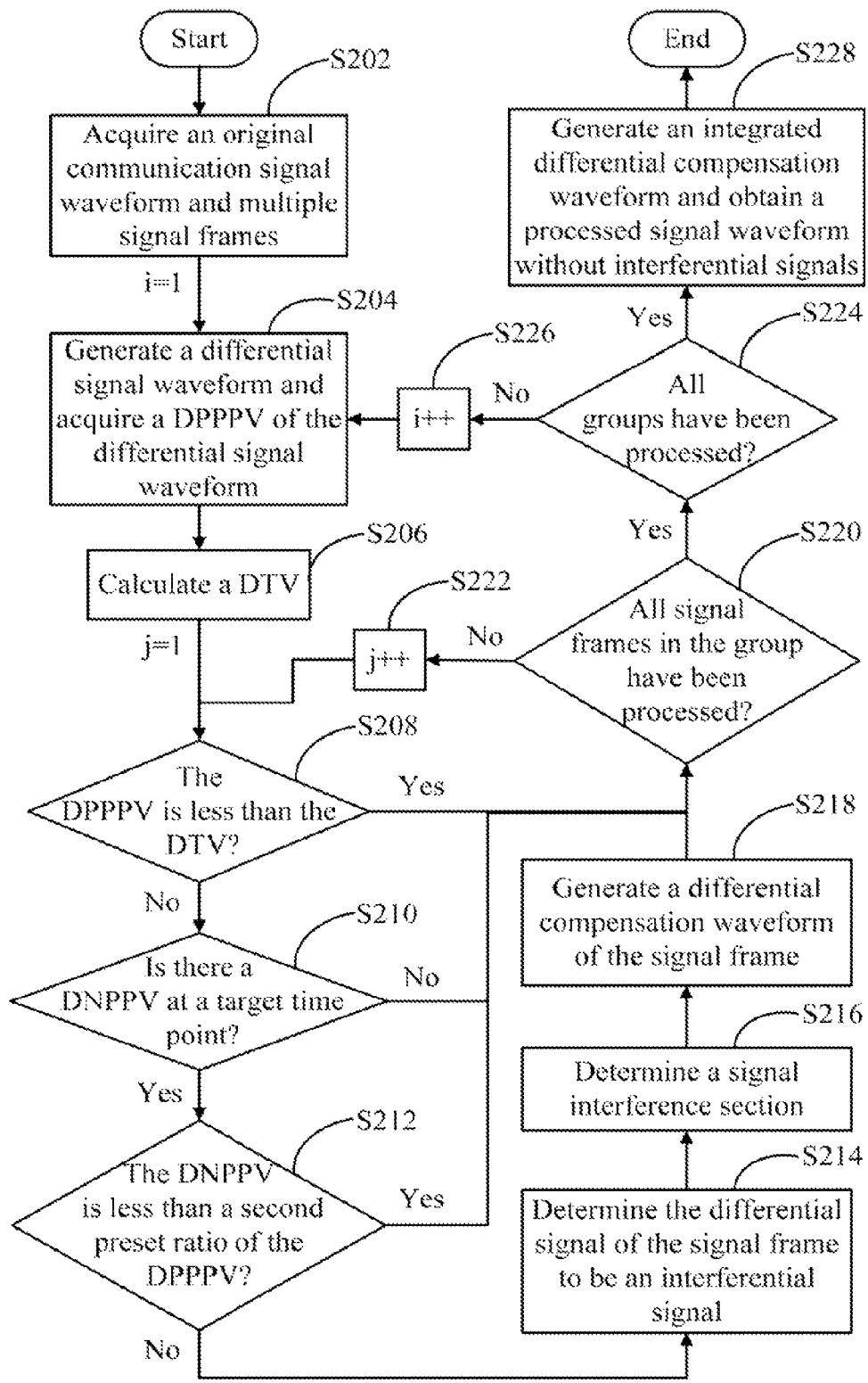
FIG. 2 is a flowchart of an embodiment of a method for removing interferential signals of a mobile device.

FIG. 2 is a flowchart of one embodiment of the method for removing interferential signals of a mobile device 600. Depending on the embodiment, additional steps may be added, others removed, and the ordering of the steps may be changed.

Figure 3:
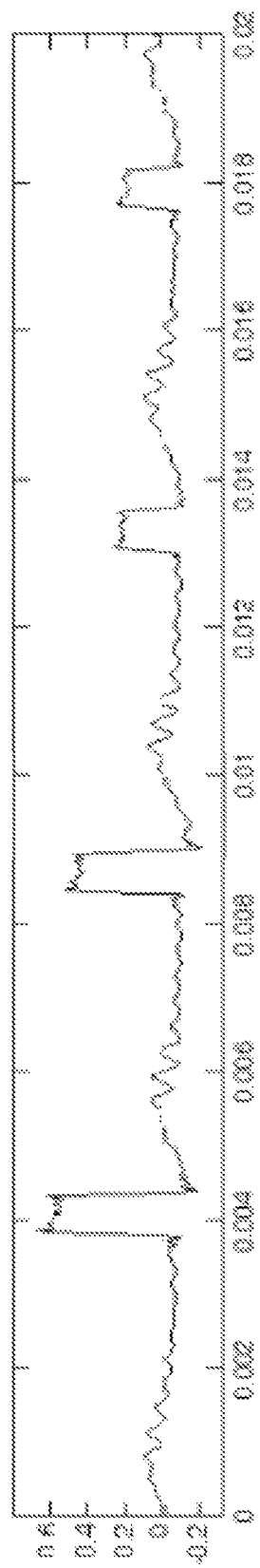
FIG. 3 illustrates an embodiment of an original communication signal waveform.

In step S202, acquiring an original communication signal waveform (as shown in FIG. 3) formed by communication signals of the mobile device 600, and acquiring multiple signal frames from the original communication signal waveform. The communication signals of the mobile device 600 may include the interferential signals. In the embodiment, the multiple signal frames are divided into multiple groups, and each group of the signal frames are processed in sequence. For example, a group includes four signal frames.

Figure 4:
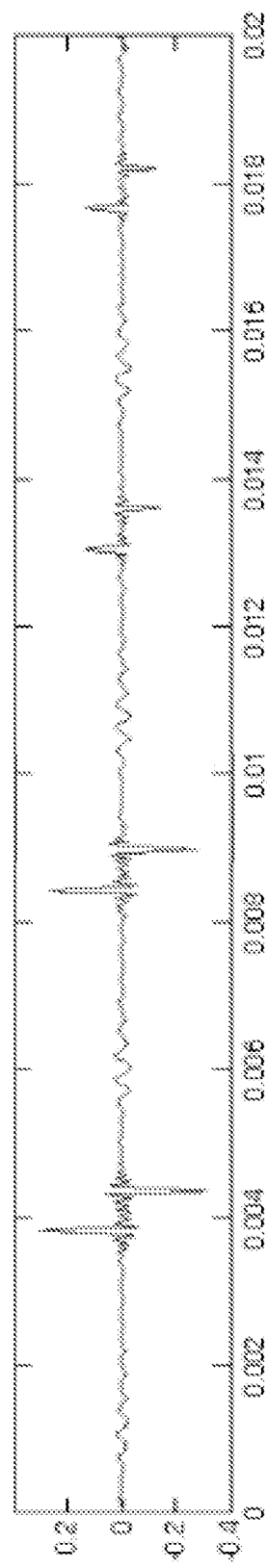
FIG. 4 illustrates an embodiment of a differential signal waveform.

In step S204, calculating a differential signal of each signal frame in a group using difference computation, thereby generating a corresponding differential signal waveform (as shown in FIG. 4), and acquiring a differential positive pulse peak value (DPPPV) of the differential signal waveform. In the embodiment, a number of the group is "i (i=1,2, . . . ,N)" and at first i=1.

In step S206, calculating a differential threshold value (DTV) according to the DPPPV corresponding to the signal frames in the group. In the embodiment, the DTV is a first preset ratio of an average of the DPPPV corresponding to the four signal frames in the group. The first preset ratio is 30 percent, for example.

In step S208, determining whether the DPPPV corresponding to one of the signal frames in the group is less than the DTV. If the DPPPV is less than the DTV, step S220 is implemented. If the DPPPV is not less than the DTV, step S210 is implemented. In the embodiment, a number of the one of the signal frames is "j (j=1,2,3,4)" and at first j=1.

Figure 5:
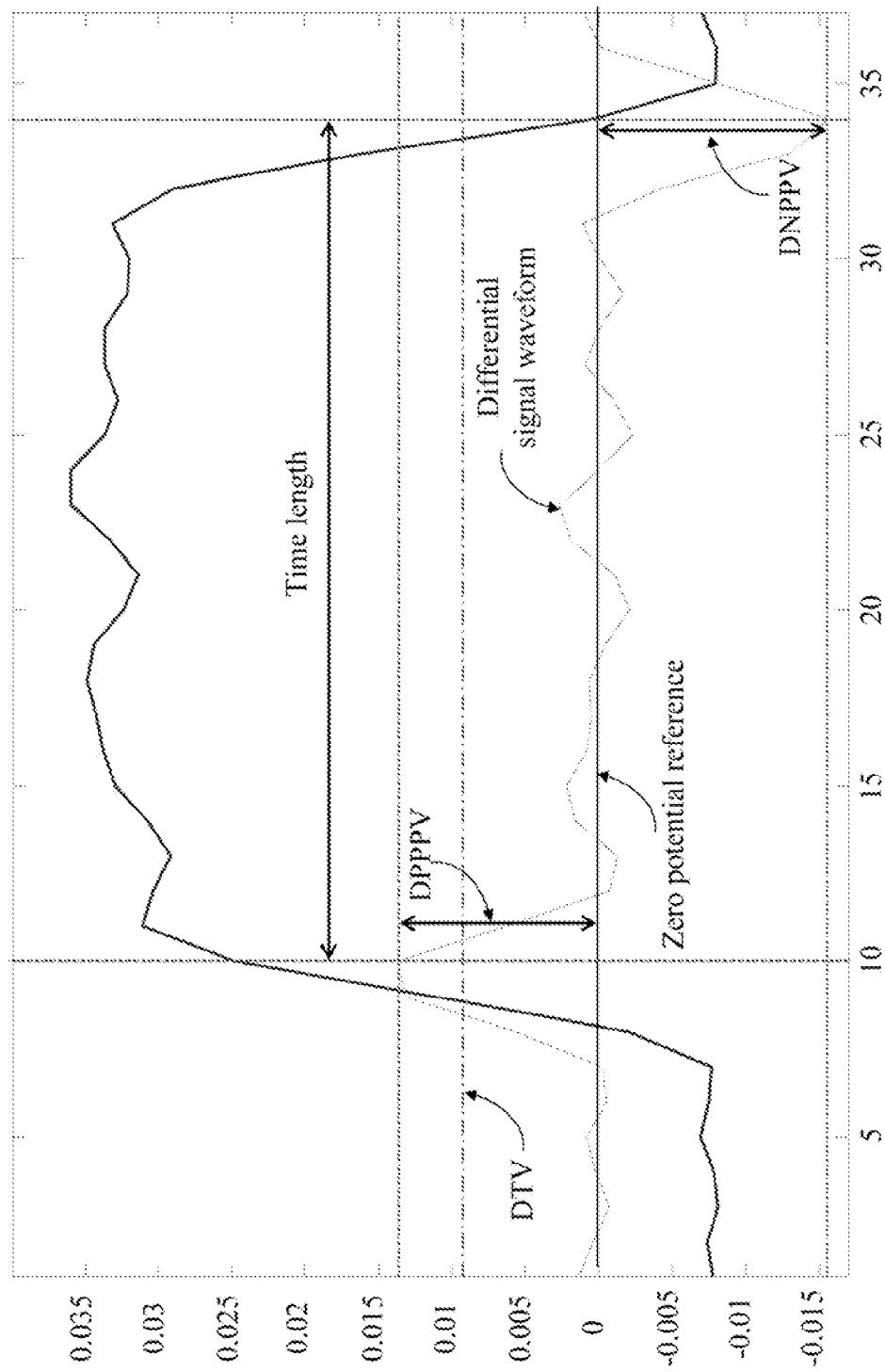
FIG. 5 illustrates an embodiment of a signal frame.

In step S210, determining whether there is a differential negative pulse peak value (DNPPV) at a target time point of the differential signal waveform corresponding to the signal frame. In the embodiment, the target time point is a time length (as shown in FIG. 5) away from a time point of the DPPPV in the differential signal waveform. The time length is 577 µs±100 µs or 577 µs±20 µs, for example. If there is a DNPPV at the target time point of the differential signal waveform, step S212 is implemented. If there is no DNPPV at the target time point of the differential signal waveform, step S220 is implemented.

FIG. 5 illustrates an embodiment of the signal frame. As shown in FIG. 5, the DPPPV of the differential signal waveform is more than the DTV, and there is a DNPPV at the target time point of the differential signal waveform.

In step S212, determining whether the DNPPV is less than a second preset ratio of the DPPPV. In the embodiment, the second preset ratio is 80 percent. If the DNPPV is less than the second preset ratio of the DPPPV, step S220 is implemented. If the DNPPV is not less than the second preset ratio of the DPPPV, steps S214-S218 are implemented.

In step S214, determining the differential signal of the signal frame to be an interferential signal.

In step S216, determining a signal interference section based on positions of wave troughs of the DPPPV and the DNPPV. In the embodiment, the signal interference section is from a left wave trough of the DPPPV to a right wave trough of the DNPPV.

In step S218, calculating compensation values corresponding to the signal interference section, to generate a differential compensation waveform of the signal frame. In the embodiment, the compensation values are reverse with the signal interference section based on a zero potential reference (as shown in FIG. 5). Then step S220 is implemented.

In step S220, determining whether all of the signal frames in the group have been processed. If all of the signal frames in the group have been processed, step S224 is implemented. If there is one or more signal frames in the group that has not been processed, step S222 is implemented.

In step S222, adding "1" to the number "j" and returning to step S208.

In step S224, determining whether all of the groups have been processed. If all of the groups have been processed, step S228 is implemented. If there is one or more groups that have not been processed, step S226 is implemented.

In step S226, adding "1" to the number "i" and returning to step S204.

Figure 6:
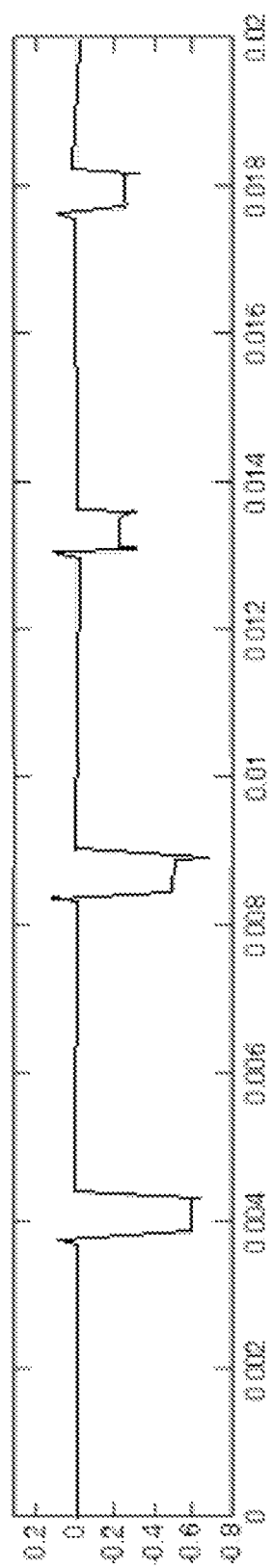
FIG. 6 illustrates an embodiment of an integrated differential compensation waveform.
Figure 7:
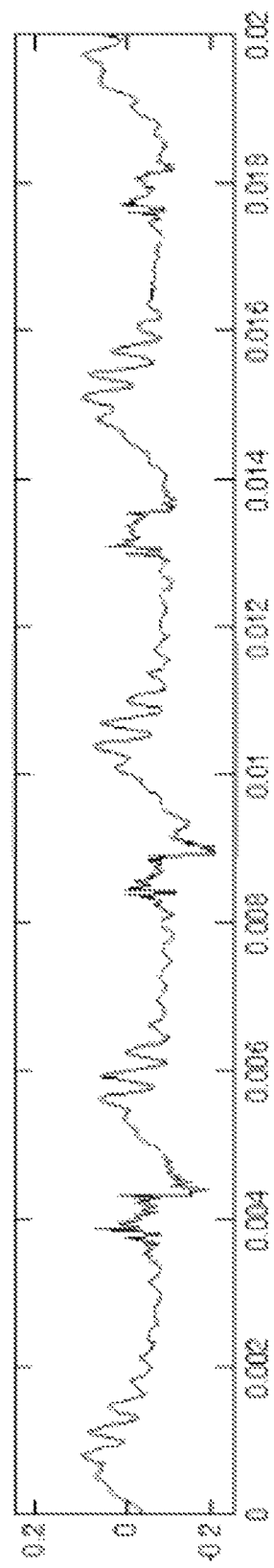
FIG. 7 illustrates an embodiment of a processed signal waveform without interferential signals.

In step S228, incorporating multiple differential compensation waveforms according to each signal frame to generate an integrated differential compensation waveform (as shown in FIG. 6), and obtaining a processed signal waveform without interferential signals (as shown in FIG. 7) according to the integrated differential compensation waveform and the original communication signal waveform. In the embodiment, the integrated differential compensation waveform and the original communication signal waveform are incorporated to obtain the processed signal waveform without interferential signals.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A method to be executed by a processor of an electronic device, the method comprising:
   (a) acquiring an original communication signal waveform formed by communication signals of a mobile device near the electronic device, and acquiring multiple signal frames from the original communication signal waveform;
   (b) calculating a differential signal of each signal frame in a group, to generate a corresponding differential signal waveform, and acquire a differential positive pulse peak value (DPPPV) of the differential signal waveform, wherein the differential signal is calculated using difference computation;
   (c) calculating a differential threshold value (DTV) according to the DPPPV corresponding to the signal frames in the group;
   (d) determining the differential signal of a signal frame in the group to be an interferential signal, in response to that the DPPPV corresponding to the signal frame is not less than the DTV, there is a differential negative pulse peak value (DNPPV) at a target time point of the differential signal waveform, and the DNPPV is not less than a second preset ratio of the DPPPV;
   (e) determining a signal interference section based on positions of wave troughs of the DPPPV and the DNPPV;
   (f) calculating compensation values corresponding to the signal interference section, to generate a differential compensation waveform of the signal frame;
   (g) incorporating multiple differential compensation waveforms to generate an integrated differential compensation waveform in response to that all of the multiple signal frames have been processed; and
   (h) obtaining a processed signal waveform without interferential signals according to the integrated differential compensation waveform and the original communication signal waveform;
   wherein the DTV is a first preset ratio of an average of the DPPPV corresponding to the signal frames in the group.

2. The method as claimed in claim 1, wherein the target time point is a time length away from a time point of the DPPPV in the differential signal waveform.

3. The method as claimed in claim 1, wherein the compensation values are reverse with the signal interference section based on a zero potential reference.

4. The method as claimed in claim 1, wherein in step (h), the integrated differential compensation waveform and the original communication signal waveform are incorporated to obtain the processed signal waveform without interferential signals.

5. A non-transitory storage medium storing a set of instructions, the set of instructions being executed by a processor of an electronic device, to perform a method comprising:
   (a) acquiring an original communication signal waveform formed by communication signals of a mobile device near the electronic device, and acquiring multiple signal frames from the original communication signal waveform;
   (b) calculating a differential signal of each signal frame in a group, to generate a corresponding differential signal waveform, and acquire a differential positive pulse peak value (DPPPV) of the differential signal waveform, wherein the differential signal is calculated using difference computation;
   (c) calculating a differential threshold value (DTV) according to the DPPPV corresponding to the signal frames in the group;
   (d) determining the differential signal of a signal frame in the group to be an interferential signal, in response to that the DPPPV corresponding to the signal frame is not less than the DTV, there is a differential negative pulse peak value (DNPPV) at a target time point of the differential signal waveform, and the DNPPV is not less than a second preset ratio of the DPPPV;
   (e) determining a signal interference section based on positions of wave troughs of the DPPPV and the DNPPV;
   (f) calculating compensation values corresponding to the signal interference section, to generate a differential compensation waveform of the signal frame;
   (g) incorporating multiple differential compensation waveforms to generate an integrated differential compensation waveform in response to that all of the multiple signal frames have been processed; and (h) obtaining a processed signal waveform without interferential signals according to the integrated differential compensation waveform and the original communication signal waveform;

wherein the DTV is a first preset ratio of an average of the DPPPV corresponding to the signal frames in the group.

6. The non-transitory storage medium as claimed in claim 5, wherein the target time point is a time length away from a time point of the DPPPV in the differential signal waveform.

7. The non-transitory storage medium as claimed in claim 5, wherein the compensation values are reverse with the signal interference section based on a zero potential reference.

8. The non-transitory storage medium as claimed in claim 5, wherein in step (h), the integrated differential compensation waveform and the original communication signal waveform are incorporated to obtain the processed signal waveform without interferential signals.

9. An electronic device, the electronic device comprising:
at least one processor; and
a storage unit storing one or more programs, when executed by the at least one processor, causing the at least one processor to:
acquire an original communication signal waveform formed by communication signals of a mobile device near the electronic device, and acquire multiple signal frames from the original communication signal waveform;
calculate a differential signal of each signal frame in a group, to generate a corresponding differential signal waveform, and acquire a differential positive pulse peak value (DPPPV) of the differential signal waveform;
calculate a differential threshold value (DTV) according to the DPPPV corresponding to the signal frames in the group, wherein the differential signal is calculated using difference computation;
determine the differential signal of a signal frame in the group to be an interferential signal, in response to that the DPPPV corresponding to the signal frame is not less than the DTV, there is a differential negative pulse peak value (DNPPV) at a target time point of the differential signal waveform, and the DNPPV is not less than a second preset ratio of the DPPPV;
determine a signal interference section based on positions of wave troughs of the DPPPV and the DNPPV;
calculate compensation values corresponding to the signal interference section, to generate a differential compensation waveform of the signal frame;
incorporate multiple differential compensation waveforms to generate an integrated differential compensation waveform in response to that all of the multiple signal frames have been processed; and
obtain a processed signal waveform without interferential signals according to the integrated differential compensation waveform and the original communication signal waveform;
wherein the DTV is a first preset ratio of an average of the DPPPV corresponding to the signal frames in the group.

10. The electronic device as claimed in claim 9, wherein the target time point is a time length away from a time point of the DPPPV in the differential signal waveform.

11. The electronic device as claimed in claim 9, wherein the compensation values are reverse with the signal interference section based on a zero potential reference.

12. The electronic device as claimed in claim 9, wherein the integrated differential compensation waveform and the original communication signal waveform are incorporated to obtain the processed signal waveform without interferential signals.

* * * * *